United States Patent
Lamers

[19]

[11] Patent Number: 5,334,108
[45] Date of Patent: Aug. 2, 1994

[54] PULLEY

[75] Inventor: Hendrikus F. Lamers, Goirle, Netherlands

[73] Assignee: Van Doorne's Transmissie B.V., Tilburg, Netherlands

[21] Appl. No.: 23,044

[22] Filed: Feb. 19, 1993

[30] Foreign Application Priority Data

Mar. 9, 1992 [NL] Netherlands .......... 9200428

[51] Int. Cl.$^5$ ............................................ F16H 59/00
[52] U.S. Cl. ............................................ 474/8; 474/28
[58] Field of Search .............. 474/8, 11, 12, 17, 18, 474/28, 25, 69, 70

[56] References Cited

U.S. PATENT DOCUMENTS

| | | |
|---|---|---|
| 3,948,111 | 4/1976 | Dittrich . |
| 4,559,026 | 12/1985 | Pitoiset ................ 474/8 X |
| 4,573,948 | 3/1986 | Thirion de Briel ........... 474/28 |
| 4,639,238 | 1/1987 | Jaccod ...................... 474/8 |
| 4,713,041 | 12/1987 | Stockton .................. 474/28 |
| 4,753,627 | 6/1988 | Kawamoto ............... 474/28 X |

FOREIGN PATENT DOCUMENTS

| | | |
|---|---|---|
| 0128611 | 12/1984 | European Pat. Off. . |
| 0181823 | 5/1986 | European Pat. Off. . |
| 4123419 | 1/1992 | Fed. Rep. of Germany . |

Primary Examiner—Thuy M. Bui
Attorney, Agent, or Firm—Young & Thompson

[57] ABSTRACT

Pulley, in particular suitable for application in a continuously variable transmission, in which an endless belt can be fitted between the discs of the pulleys, the path of which endless belt can be influenced by a cylinder/piston device. The cylinder/piston device is provided with at least one pressure chamber provided with walls, one of the walls being provided with a resilient hinge, as a result of which elastic expansion of the wall around the hinge is achieved at relatively high pressures in the pressure chamber. Therefore, the shaft, along which at least one of the discs is axially displaceable, is not clamped and deformed to a lesser extent under heavy load, so that the action of the transmission is not impeded.

7 Claims, 1 Drawing Sheet

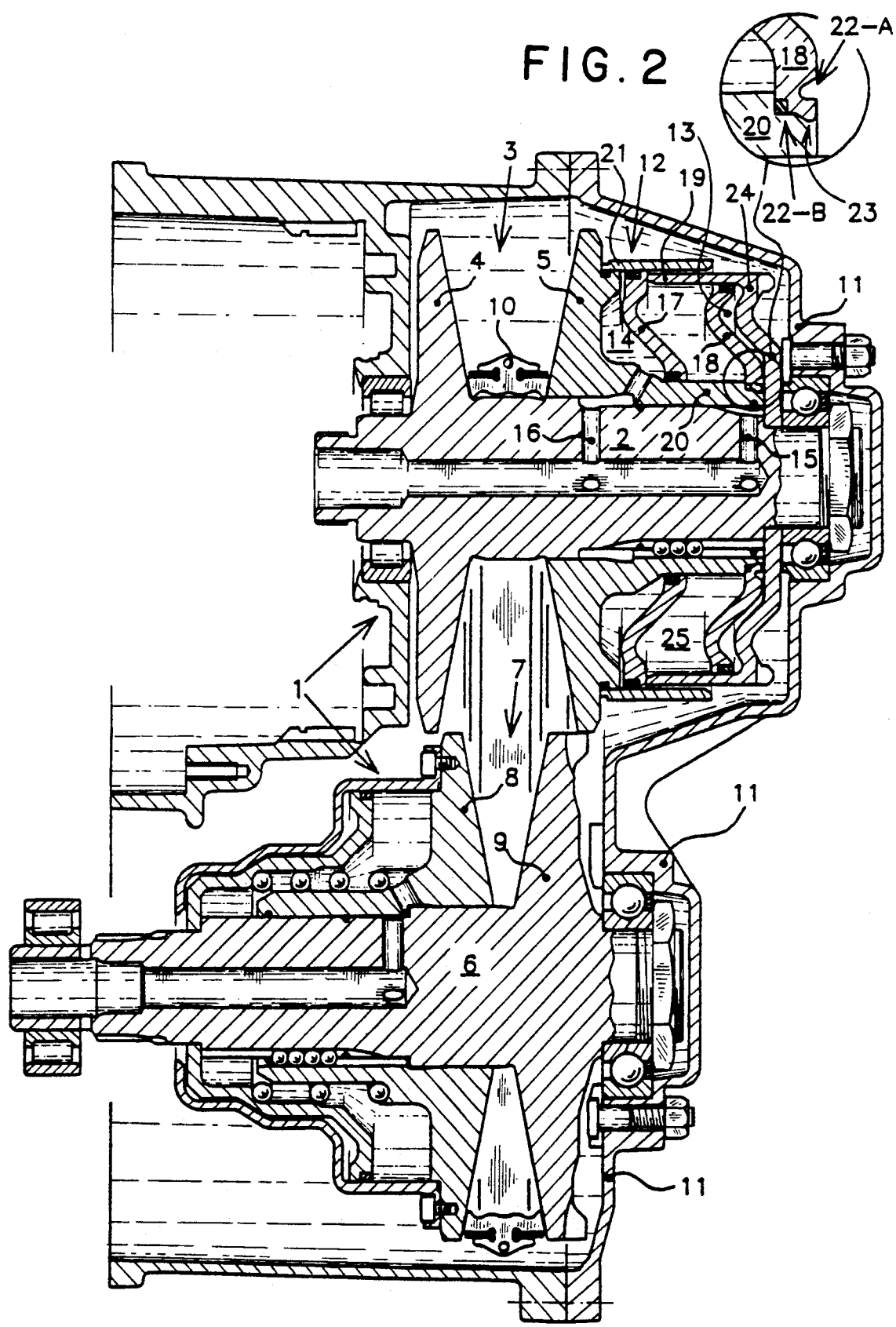

PULLEY

FIELD OF THE INVENTION

The invention relates to a pulley, in particular suitable for application in a continuously variable transmission, in which the pulley is provided with a set of discs which are fitted on a shaft and between which an endless belt can be fitted, in which at least one disc is axially displaceable and provided with cylinder/piston means, which cylinder/piston means comprise at least one pressure chamber provided with walls.

BACKGROUND OF THE INVENTION

Pulleys of the above-mentioned kind are generally known and are used, in particular, in continuously variable transmissions. Such a pulley is disclosed in European Patent 128,611.

Particularly when a relatively high torque is transmitted by the known pulley, problems may arise regarding the degree of stability of the pulley, and deformations can be observed which may affect the action of the transmission.

SUMMARY OF THE INVENTION

The object of the present invention is to provide an improved pulley which is also suitable for relatively high powers and whose stability and resistance to permanent deformation are improved.

To this end, the pulley according to the invention is characterized in that at least one of the walls of the pressure chamber, approximately at the position where it is secured, is provided with a resilient hinge.

The presence of this resilient hinge in the wall material of the pressure chamber of the cylinder/piston means has the result that, under the influence of the momentary relatively high pressure, the relevant wall can locally absorb forces in an elastic manner, in particular if the transmission transmits a high torque. The absorption of the forces is effected at a predetermined, known position of the resilient hinge, and in a predictable manner. In this position, the forces are absorbed locally by elastic deformation and by controlled expansion of the wall around the resilient hinge. Because the forces are to a large extent absorbed in an elastic manner by the wall with the resilient hinge, they are passed on to the supporting part, for example the supporting shaft on which the displaceable disc is mounted, in very much reduced form, as a result of which, under heavy load, clamping and deformation of the relevant part, in particular the shaft, is prevented. The stability and the resistance to permanent deformation, as well as the action of the transmission are therefore greatly improved.

In a further embodiment of the pulley, the resilient hinge is designed as one or more thinner sections in the wall. Such thinner sections can be provided very easily in the walls.

In a further embodiment of the pulley, the fixed connection is designed as a force fit.

Such an embodiment has the advantage that, on the one hand, a fixed connection is achieved by combining the force fit and the closely adjacent resilient hinge, while, on the other hand, a certain degree of elastic deformation is possible without this resulting in permanent deformation.

BRIEF DESCRIPTION OF THE DRAWINGS

The invention will be explained in more detail, together with its further advantages, with reference to the following drawings, wherein FIG. 1 shows a diagrammatic illustration of a continuously variable transmission having a pulley according to the invention, and FIG. 2 is a circled detail of the transmission which has been taken out and enlarged.

DETAILED DESCRIPTION OF THE INVENTION

The figure diagrammatically shows a continuously variable transmission 1 which is illustrated in part. The transmission 1 comprises a primary shaft 2, on which a primary pulley 3 is fitted in the form of discs 4 and 5, disc 5 being axially displaceable along the shaft 2 in a manner still to be specified. The transmission 1 furthermore comprises a secondary shaft 6, on which a secondary pulley 7 is fitted with discs 8 and 9, the partly shown disc 8 of which may be displaced along the shaft 6. An endless drive belt, chain or belt 10 has been fitted around the pulleys 3 and 7, the path of the belt 10 between the sets of discs 4, 5; 8, 9 being variable and dependent on the axial position of the displaceable discs 5 and 8.

The primary shaft 2 is connected in a manner known per se to an engine (not shown) and the secondary shaft 6 is connected to the wheels of a vehicle (not shown).

Inside the partly illustrated clutch housing 11 are fitted, in particular, the, generally two, movable discs 5 and 8, and, in the remainder of this description, the disc 5 will be explained in more detail. The axially displaceable disc 5 comprises cylinder/piston means 12 which generally comprise at least one pressure chamber 14. In the embodiment shown, the transmission 1 comprises cylinder/piston means which comprise a further, second pressure chamber 13. However, it is possible that, under certain circumstances, as desired, providing the means 12 with a single pressure chamber is sufficient. The chamber 25 is unpressurised. A medium under pressure is supplied to and discharged from, in this case, both the chambers 13 and 14 through suitable passages 15 and 16, in order thereby to affect the axial position of disc 5. The pressure chamber 13 comprises essentially radially directed walls 18 and 24, in addition to wall 19 and shaft 2. Wall 17 is displaceable between wall 20 and cylinder wall 21 of the disc 5. In addition, wall 17 rests against the wall 19, while one end of wall 18 rests displaceably on wall 19 and, in this embodiment, is connected by its other, circled end to wall 20 of the disc 5.

The enlarged detail shows that, at the position of the point where the walls 18 and 20 are connected to one another, there is a resilient hinge 22 which, in the embodiment shown, is even fitted at both sides of the wall 18 and has the form of a thinner section 22A outside the wall and a thinner section 22B inside the wall. Thus, wall 18 can expand flexibly, in particular if the pressure in the pressure chamber 13 is high, thereby preventing clamping and deformation of the wall 20. It is to be noted that, in the enlarged detail, walls 18 and 20 are in a position at some distance from wall 24.

In the preferred embodiment shown, the connection between the walls 18 and 20 close to the constriction 22A, 22B was effected by means of a force fit. In this case, the force fit is preferably of such elastic design that the wall 20 remains displaceable relative to the shaft 2.

If desired, a recess 23 can be provided, into which the material of the wall 18 can be deformed during the manufacturing step, so that a positive connection is achieved. In this case, recess 23 has to be of such design that no notch effect can occur.

In the embodiment shown, the recess 23 is provided in the wall section 20 of the displaceable disc 5, which wall section runs in the axial direction. It will be obvious that the invention is not limited to the embodiment shown and that other further embodiments are conceivable within the scope of the invention. Thus, wall 24 of pressure chamber 13 can also be mounted on shaft 2 in a corresponding manner.

I claim:

1. Pulley, suitable for application in a continuously variable transmission, said pulley comprising: a set of discs which are fitted on a shaft and between which an endless belt can be fitted, at least one of said discs being axially displaceable and being provided with cylinder/piston means, said cylinder/piston means having at least one pressure chamber provided with radial and concentric cylinder walls, at least one of the walls being sealingly displaceable along a circular surface of one of the cylinder walls, at least one of the radial walls of the pressure chamber being secured by means of a force fit, and being provided with a resilient hinge approximately at the position of said fit.

2. Pulley according to claim 1, in which the resilient hinge (22) comprises at least one or more thinner sections (22A, 22B) in the wall (18).

3. Pulley according to claim 1, in which the resilient hinge (22) is on the inside (22B) and/or outside (22A) of said at least one radial wall (18) of the pressure chamber (13).

4. Pulley according to claim 1, in which the force fit is of elastic design.

5. Pulley according to claim 4, in which the force fit is provided with a recess (23).

6. Pulley according to claim 4, wherein the force fit is provided on a section of one of the concentric cylinder walls, of the displaceable disc, running in the axial direction.

7. Pulley according to claim 4, wherein the force fit is provided on a section of the shaft.

* * * * *